United States Patent
Samper et al.

(10) Patent No.: US 9,067,189 B2
(45) Date of Patent: Jun. 30, 2015

(54) MICROFLUIDIC DEVICE AND A RELATED METHOD THEREOF

(75) Inventors: Victor Donald Samper, Bavaria (DE); Ruben Julian Horvath-Klein, Munich (DE); Marko Klaus Baller, Saarbrücken (DE); Christian Friedrich Peter Rensch, Munich (DE); Christoph Boeld, Munich (DE)

(73) Assignee: General Electric Company, Niskayuna, NY (US)

( * ) Notice: Subject to any disclaimer, the term of this patent is extended or adjusted under 35 U.S.C. 154(b) by 448 days.

(21) Appl. No.: 13/435,358

(22) Filed: Mar. 30, 2012

(65) Prior Publication Data

US 2013/0255789 A1   Oct. 3, 2013

(51) Int. Cl.
*B01J 19/00* (2006.01)
*B01L 3/00* (2006.01)
*B01F 5/10* (2006.01)
*B01F 13/08* (2006.01)

(52) U.S. Cl.
CPC ........... *B01J 19/0093* (2013.01); *B01L 3/5027* (2013.01); *B01J 2219/00889* (2013.01); *B01J 2219/00891* (2013.01); *B01J 2219/00898* (2013.01); *B01F 5/10* (2013.01); *B01F 13/0818* (2013.01)

(58) Field of Classification Search
CPC ........... C12M 1/34; C12M 1/00; C12P 19/34; F17D 3/00; B01L 3/00; B01J 19/00; B01D 3/14; G01N 33/48; G01N 1/00
See application file for complete search history.

(56) References Cited

U.S. PATENT DOCUMENTS

| | | |
|---|---|---|
| 6,828,143 B1 | 12/2004 | Bard |
| 2004/0258569 A1 | 12/2004 | Yamazaki et al. |
| 2006/0102519 A1 | 5/2006 | Tonkovich et al. |

(Continued)

FOREIGN PATENT DOCUMENTS

| | | |
|---|---|---|
| EP | 1007623 B1 | 10/2005 |
| WO | 2006134401 A1 | 12/2006 |

(Continued)

OTHER PUBLICATIONS

Search Report and Written Opinion from corresponding PCT Application No. PCT/US2013/027335 dated Jul. 17, 2013.

(Continued)

*Primary Examiner* — Lore Jarrett
(74) *Attorney, Agent, or Firm* — Robert M. McCarthy

(57) ABSTRACT

A microfluidic device includes a plurality of reagent sources for a feeding a plurality of reagents, each reagent source feeding a corresponding reagent among the plurality of reagents. A macro-chamber receives one or more reagents among the plurality of reagents from the plurality of reagent sources. A microfluidic reactor is coupled to the macro-chamber and the plurality of reagent sources and configured to receive one or more reagents among the plurality of reagents from at least one of the macro-chamber, the plurality of reagent sources, and react the one or more reagents to generate reaction content. The macro-chamber is further configured to receive the reaction content from the microfluidic reactor. A system configured to control at least one of flow of a dry gas in and out of the macro-chamber, surface area of at least one of the one or more reagents, and the reaction content in the macro-chamber.

27 Claims, 8 Drawing Sheets

(56) References Cited

U.S. PATENT DOCUMENTS

| | | |
|---|---|---|
| 2007/0184547 A1* | 8/2007 | Handique et al. .......... 435/288.5 |
| 2008/0138815 A1 | 6/2008 | Brown et al. |
| 2008/0250849 A1 | 10/2008 | Le Comte et al. |
| 2008/0281090 A1 | 11/2008 | Lee et al. |
| 2009/0130719 A1 | 5/2009 | Handique |
| 2010/0069600 A1 | 3/2010 | Morelle et al. |
| 2010/0093098 A1 | 4/2010 | Ball et al. |
| 2010/0196254 A1 | 8/2010 | Lemaire et al. |
| 2010/0300869 A1 | 12/2010 | Kretschmer et al. |
| 2011/0023970 A1 | 2/2011 | Rapp et al. |
| 2011/0053151 A1 | 3/2011 | Hansen et al. |
| 2012/0214941 A1 | 8/2012 | Kleiner et al. |

FOREIGN PATENT DOCUMENTS

| | | |
|---|---|---|
| WO | 2009082535 A3 | 3/2010 |
| WO | 2011054789 A1 | 5/2011 |
| WO | 2013066560 A2 | 5/2013 |

OTHER PUBLICATIONS

US 7,897,368, 03/2011, Handique et al. (withdrawn)

* cited by examiner

MICROFLUIDIC DEVICE AND A RELATED METHOD THEREOF

BACKGROUND

Microfluidic devices and methods are of significant and increasing importance in biomedical and pharmaceutical research. Microfluidic technology is applied to sequentially synthesize or batch synthesize fine chemicals and pharmaceuticals. Continuous flow micro-reactors have also been used instead of batch micro-reactors to synthesize fine chemicals and pharmaceuticals. Continuous flow micro-reactors have been demonstrated for chemical processes on the nanoliter to liter scales, with advantages of enhanced heat transfer performance, faster diffusion times and reaction kinetics, and improved reaction product selectivity.

A typical microfluidic device includes micro-channels or other microfluidic features with characteristic cross-section dimensions in the range of microns to 100's of microns. In such channels or features, viscous forces, surface tension, and applied external forces generally dominate over gravitational forces. Such a regime of operation makes it difficult to perform some conventional macro processes in the traditional manner, where gravity is utilized. Conventional processes that utilize gravity include bubble extraction into a headspace, boiling, liquid phase extraction, and sedimentation.

A chamber large enough to utilize gravitational forces on the fluid can be created in a planar format, consistent with a typical microfluidic credit card device format. However in constraining the chamber to a planar format, new factors must be considered. These factors include maximizing the free surface for processes that require a free surface, such as evaporation, and controlling the wetting or wicking of fluid on the chamber walls. When capillary forces and surface wetting, drive liquids excessively up or along the walls in the chamber, unintended wetting of certain areas of the chamber occurs. When the liquid having one or more compounds is transported by wetting inside the chamber, a side effect is that species in the liquid can reach areas of the microstructure that was not intended. If the species adhere to surfaces in these regions, this can lead to unwanted adhesion and losses. In some cases, such as corners, it can be difficult to release the adhered species.

BRIEF DESCRIPTION

In accordance with one embodiment of the present invention, a microfluidic device is disclosed. The device includes a plurality of reagent sources for a feeding a plurality of reagents, each reagent source feeding a corresponding reagent among the plurality of reagents. A macro-chamber receives one or more reagents among the plurality of reagents from the plurality of reagent sources. A microfluidic reactor is coupled to the macro-chamber and the plurality of reagent sources and configured to receive one or more reagents among the plurality of reagents from at least one of the macro-chamber, the plurality of reagent sources, and react the one or more reagents to generate reaction content. The macro-chamber is further configured to receive the reaction content from the microfluidic reactor. A system configured to control at least one of flow of a dry gas in and out of the macro-chamber, surface area of at least one of the one or more reagents, and the reaction content in the macro-chamber.

In accordance with another embodiment of the present invention, a method includes feeding one or more reagents from one or more reagent sources to a macro-chamber in a microfluidic device. The method further includes controlling at least one of flow of a dry gas in and out of the macro-chamber, and surface area of one or more reagents in the macro-chamber.

DRAWINGS

These and other features and aspects, of embodiments of the present invention will become better understood when the following detailed description is read with reference to the accompanying drawings in which like characters represent like parts throughout the drawings, wherein.

Figure 15:
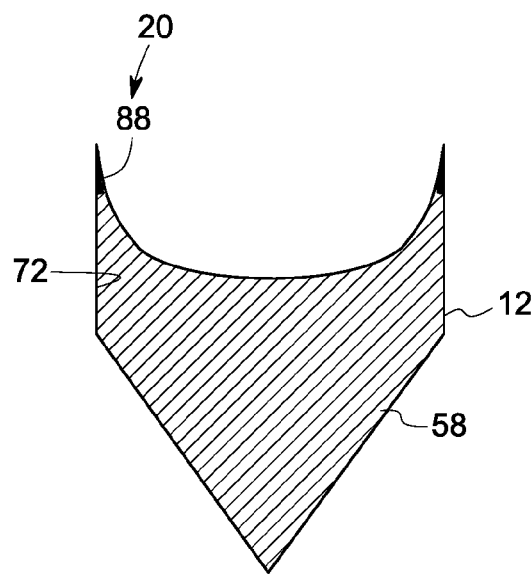
Figure 16:
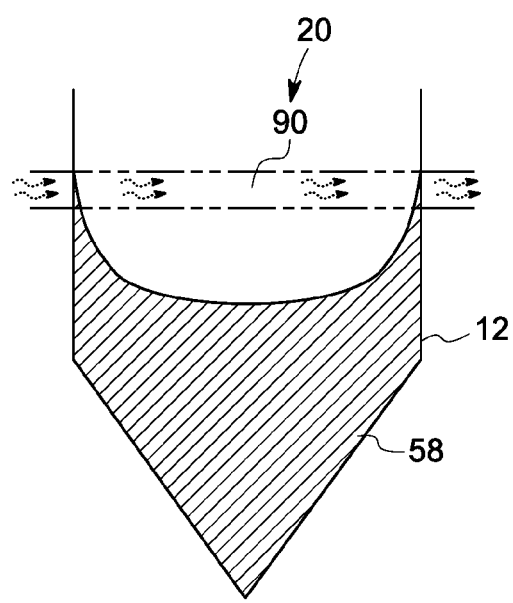

FIG. 15 is a diagrammatical view of a portion of a macro-chamber having a system with a soluble material coating for controlling the surface area of a content in accordance with an exemplary embodiment of the present invention; and FIG. 16 is a diagrammatical view of a portion of a macro-chamber having a system with thermal barrier for controlling the surface area of a content in accordance with an exemplary embodiment of the present invention.

DETAILED DESCRIPTION

As discussed in detail below, embodiments of the present invention disclose a microfluidic device. The device includes a plurality of reagent sources for a feeding a plurality of reagents, each reagent source feeding a corresponding reagent among the plurality of reagents. A macro-chamber receives one or more reagents among the plurality of reagents from the plurality of reagent sources. A microfluidic reactor is coupled to the macro-chamber and the plurality of reagent sources and configured to receive one or more reagents among the plurality of reagents from at least one of the macro-chamber, the plurality of reagent sources, and react the one or more reagents to generate a reaction content. The macro-chamber is further configured to receive the reaction content from the microfluidic reactor. A system is configured to control at least one of flow of a dry gas in and out of the macro-chamber, surface area of at least one of the one or more reagents in the macro-chamber, and the reaction content in the macro-chamber. In accordance with another embodiment, a method associated with the macro-chamber is disclosed.

Embodiments disclosed herein includes a structure or arrangement that brings together the advantages of microfluidic integration, heat transfer, and surface area related performance of capillary and micro-channel systems, and the flexibility to utilize gravitational effects whilst avoiding unwanted effects such as undesired wetting.

Figure 1:
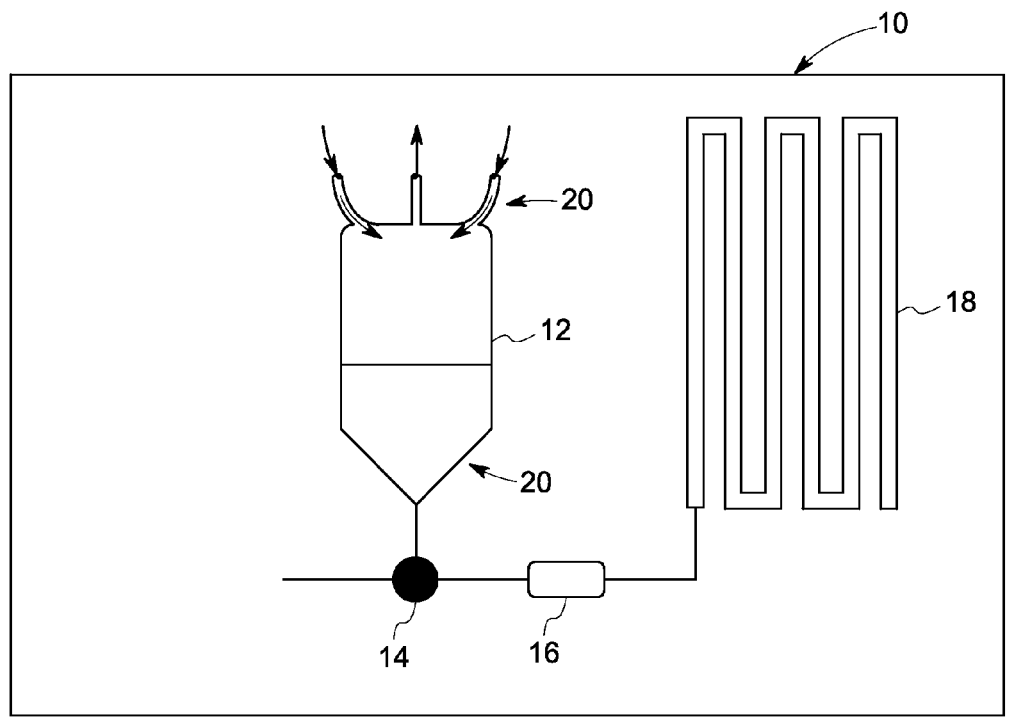
FIG. 1 is a diagrammatical view of a microfluidic device having a macro-chamber, a mixing device, a fluid chamber, and a microfluidic reactor in accordance with an exemplary embodiment of the present invention.

Referring to FIG. 1, a microfluidic device 10 in accordance with an exemplary embodiment of the present invention is disclosed. In the illustrated embodiment, the microfluidic device 10 includes a macro-chamber 12, a mixing device 14, a fluid chamber 16, and a microfluidic reactor 18. The macro-chamber 12 is used for storing one or more reagents temporarily, or for performing operations at a size domain where gravity, mass, and other macro effects dominate over microscale dominating phenomena such as viscosity and surface tension e.g. bubble extraction into a headspace, boiling, liquid phase extraction, sedimentation, change concentration of dissolved compounds, or the like. In one embodiment, the macro-chamber 12 functions as an azeotropic chamber. In other embodiments, other types of macro-chambers are possible. The mixing device 14 is coupled to the macro-chamber 12 and configured to mix two or more reagents and to generate a mixture of two or more reagents. The fluid chamber 16 is used for storing a marker fluid. In a specific embodiment, the marker fluid is a gas slug. In another embodiment, the marker fluid is a fluorescent liquid having a different property compared to the gas slug. In another embodiment, the marker fluid is a liquid that is not miscible with the macro-chamber fluid, and has a property that can be used to distinguish it from the macro-chamber fluid, such as electrical conductivity, dielectric constant, thermal conductivity, density, optical absorbance, refractive index, or the like. In the illustrated embodiment, the microfluidic reactor 18 is coupled to the macro-chamber 12 via the mixing device 14 and the fluid chamber 16. The microfluidic reactor 18 is configured to receive the mixture of two or more reagents from the macro-chamber 12, or from a combination of the macro-chamber 12 and one or more reagent sources (not shown in FIG. 1) fed into the mixing device 14, and to generate reaction content. The reagents may include liquid reagents, gaseous reagents, or combinations thereof. In certain embodiments, the macro-chamber 12 may be integrated to the microfluidic reactor 18.

In one embodiment, the mixing device 14 is configured to receive two or more reagents from a plurality of reagent sources, and mix the two or more reagents to generate a mixture of two or more reagents. It should be noted herein that all types of mixing devices can be implemented. In a specific embodiment, the mixture of two or more reagents are fed from the mixing device 14 to the macro-chamber 12. In an alternative embodiment, the mixture of two or more reagents are fed from the mixing device 14 to the microfluidic reactor 18.

In another embodiment, the mixing device 14 is configured to receive one or more reagents from the macro-chamber 12, mix the one or more reagents with other reagents fed from a plurality of reagent sources (not shown in FIG. 1) to generate a mixture of two or more reagents, and then feed the mixture of two or more reagents into the microfluidic reactor 18. In an alternative embodiment, the mixture of two or more reagents are fed through the mixing device 14 to the microfluidic reactor 18, which is used as a storage zone rather than a reactor, before the contents are fed back into the macro-chamber 12. This process can be repeated multiple times to enhance mixing.

In one embodiment, the mixing device 14 is integrated with the macro-chamber 12 and configured to mix the two or more reagents within the macro-chamber 12. In another embodiment, the mixing device 14 is a gas supply source configured to supply gas bubbles to the macro-chamber 12 so as to enable mixing of the two or more reagents stored in the macro-chamber 12. In a specific embodiment, the mixing device 14 may employ ultrasonic agitation for mixing two or more reagents. In another embodiment, the mixing device 14 is integrated with the microfluidic reactor 18 and configured to mix two or more reagents within the microfluidic reactor 18.

It should be noted herein that the term "macro-chamber" is used to describe a chamber in a planar microfluidic device, with dimensions such that gravitational effects can be utilized. Such a cross-section with the dimension of the shortest length may be in the range of 1 mm or longer, for example. The term "microfluidic reactor" is used to describe a microfluidic channel with a cross-section characteristic dimension in the range of microns to 100's of microns, for example.

In the illustrated embodiment, during operation of the microfluidic device 10, the microfluidic reactor 18 is maintained at a first temperature and the macro-chamber 12 is maintained at a second temperature substantially lower than the first temperature. In another embodiment, the microfluidic reactor 18 may be maintained at a lower temperature than the macro-chamber 12, or driven to ramp up or down in temperature. In a specific embodiment, the microfluidic reactor 18 and the macro-chamber 12 may be maintained at the same temperature (predefined temperature). In one embodiment, the reaction content is fed from the microfluidic reactor 18 to the macro-chamber 12. In another embodiment, the reaction content is temporarily stored in the microfluidic reactor 18 and not fed to the macro-chamber 12.

It should be noted herein that the evaporation of a liquid content in the macro-chamber 12 is a function of temperature, gas pressure, surface area, the type (or mixture) of liquids, and the concentration of liquid vapor at the liquid surface. The rate of evaporation of the liquid content can be increased by increasing the temperature, the surface area, and the gas flow over the surface. Controlling surface area of the liquid content is more challenging compared to controlling temperature and gas flow within the macro-chamber 12. In accordance with the embodiments of the present invention, the macro-chamber 12 is provided with a system 20 for controlling surface area of the liquid content in the macro-chamber 12. The system includes but is not limited to, design features of the macro-chamber, a device for inducing gas flow in the macro-chamber, a device for generating circulating flow pattern of the content in the macro-chamber, surface topology/chemical surface modification of the macro-chamber, electro wetting elements, thermal barrier zones, a magnetic system, or the like.

Figure 2:
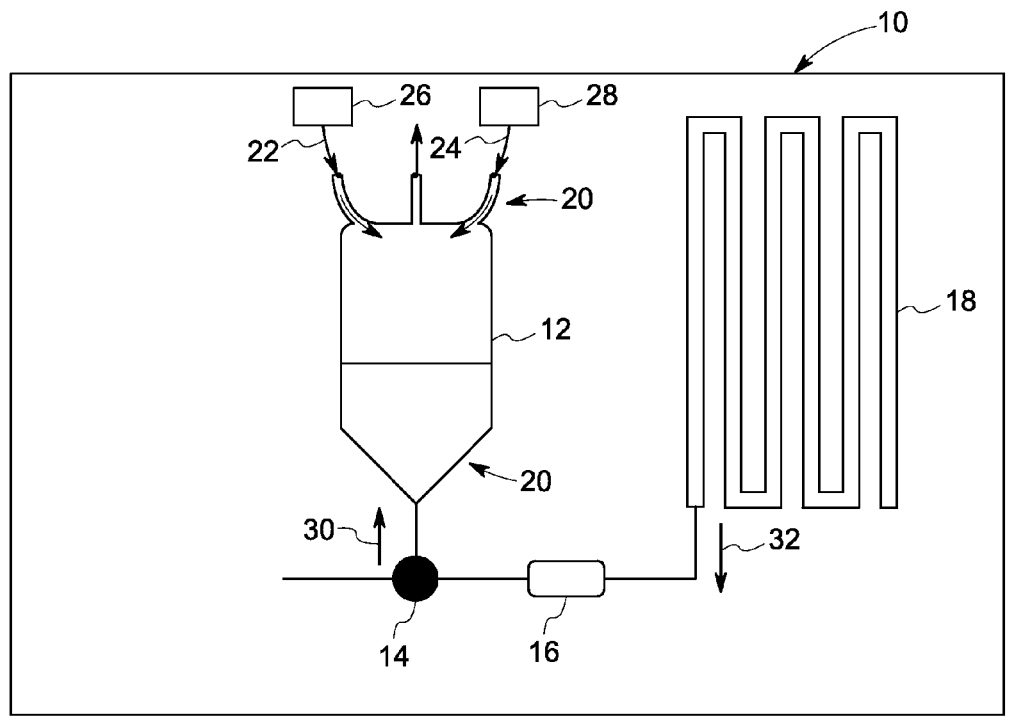
FIG. 2 is a diagrammatical view of a microfluidic device having a macro-chamber, a mixing device, a fluid chamber, and a microfluidic reactor in accordance with an exemplary embodiment of the present invention.

Referring to FIG. 2, the microfluidic device 10 is disclosed in accordance with an exemplary embodiment of the present invention. As discussed previously, the microfluidic device 10 includes the macro-chamber 12, the mixing device 14, the fluid chamber 16, and the microfluidic reactor 18. In the illustrated embodiment, two reagents 22, 24 are fed from sources 26, 28 respectively, to the macro-chamber 12. In other embodiments, more than two reagents are possible. In one embodiment, the two reagents 22, 24 are fed to the macro-chamber 12 simultaneously. In another embodiment, the two reagents 22, 24 are fed to the macro-chamber 12 sequentially, for example. The two reagents 22, 24 are then fed from the macro-chamber 12 to the mixing device 14. The two reagents 22, 24 are mixed within the mixing device 14 to generate a mixture 30 of the reagents. The mixture 30 of the reagents is then fed from the mixing device 14 to the macro-chamber 12. In one embodiment, the mixing device 14 may be within the macro-chamber 12 so as to enable mixing of the reagents 22, 24 within the macro-chamber 12. In another embodiment, the mixture 30 of the reagents is fed from the mixing device 14 to the microfluidic reactor 18. In another embodiment, the mixing device 14 may be within the microfluidic reactor 18 so as to enable mixing of the reagents 22, 24 within the reactor 18. Feeding in reagents 22, 24 from a top end of the macro-chamber 12, washes or rinses the walls of the macro-chamber 12 without requiring large volumes of reagent compared to the case of filling the macro-chamber 12 from its base end upwards.

In one embodiment, after the mixture 30 of the reagent is generated in the macro-chamber 12, the mixture 30 of the reagent is displaced from the macro-chamber 12 to the microfluidic reactor 18 via the fluid chamber 16. The mixture 30 of the reagents may then be reacted in the microfluidic reactor 18 to generate a reaction content 32. The reaction content 32 may then be transferred from the microfluidic reactor 18 to the macro-chamber 12. More reagents may be fed to macro-chamber 12, mixed with the reaction content, and then displaced to the microfluidic reactor 18 as discussed above. The process may be repeated as many number of times as per requirement. The system 20 of the macro-chamber 12 for controlling surface area of the liquid content in the macro-chamber 12 is disclosed in further detail with reference to subsequent figures.

Figure 3:
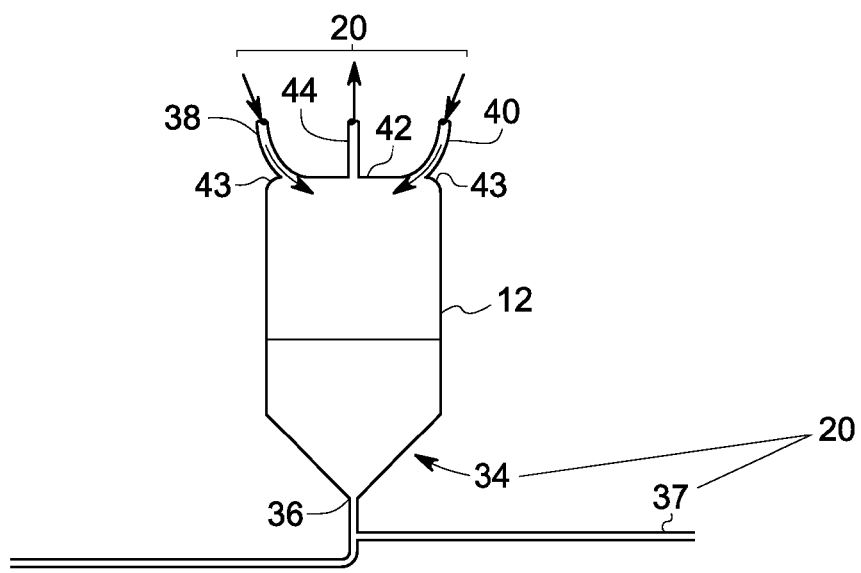
FIG. 3 is a diagrammatical view of a macro-chamber having features for controlling flow of a dry gas, and surface area of a liquid content in accordance with an exemplary embodiment of the present invention.

Referring to FIG. 3, the macro-chamber 12 in accordance with one embodiment of the present invention is disclosed. In the illustrated embodiment, system 20 includes a tapered section 34 at a first end 36 of the macro-chamber 12. The system 20 further includes one first inlet 37 at the first end 36 and two second inlets 38, 40 at a second end 42 of the macro-chamber 12. Further, one first outlet 44 is disposed at the second end of the macro-chamber 12. It should be noted that the number of the inlets and outlets discussed herein may vary depending on the application. The first outlet 44 is disposed offset from predefined edge profile portions 43 of the macro-chamber 12. In certain embodiments, the predefined edge profile is a continuous edge profile. In certain other embodiments, the predefined edge profile is a non-continuous edge profile. The chemical reaction processes in the macro-chamber 12 may include drying or an evaporation step for removing water/solvent, perform phase transfer, change concentrations of dissolved compounds, or the like. Liquid content loaded into the macro-chamber 12 is accumulated at the bottom end due to gravity. When the macro-chamber 12 is used as a drier/evaporator, heat is applied, and dry gas is fed through the inlets and ejected via the outlets. The combination of the application of heat and partial vapor pressures gradient at the interface of the gas and liquid in the macro-chamber 12 results in rapid evaporation. The ambient pressure in the head space can be controlled above, below, or equal to atmospheric pressure. The tapered section 34 enables processing smaller volumes of the content and also facilitates high surface to volume ratio of the content. The first outlet 44 is disposed away from the corners of the macro-chamber 12 to enable better exit flow from the macro-chamber 12. Provision of a plurality of gas inlets and outlets results in enhanced flow of gas along the liquid surface in the macro-chamber 12.

The first inlet 37 controls flow of the dry gas, reagents into and out of the macro-chamber 12. The second inlets 38, 40 controls flow of the dry gas into and out of the macro-chamber 12. The second inlets 38, 40 also control flow of the reagents into the macro-chamber 12. It should be noted herein that the orientation angle of the second inlets 38, 40 has a strong impact on the gas flow pattern created inside the macro-chamber 12 for optimizing evaporation and drying performance as well as moisture evacuation. The first outlet 44 controls flow of the dry gas out from the macro-chamber 12.

Figure 4:
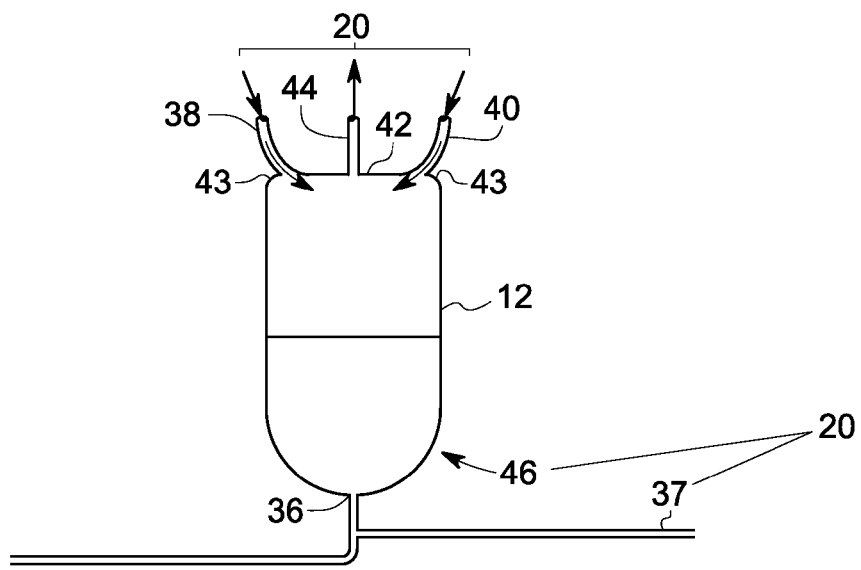
FIG. 4 is a diagrammatical view of a macro-chamber having features for controlling flow of a dry gas, and surface area of a liquid content in accordance with an exemplary embodiment of the present invention.

Referring to FIG. 4, the macro-chamber 12 in accordance with one embodiment of the present invention is disclosed. Compared to the previous embodiment, the system 20 includes a section 46 having a predefined edge profile at the first end 36 of the macro-chamber 12.

Figure 5:
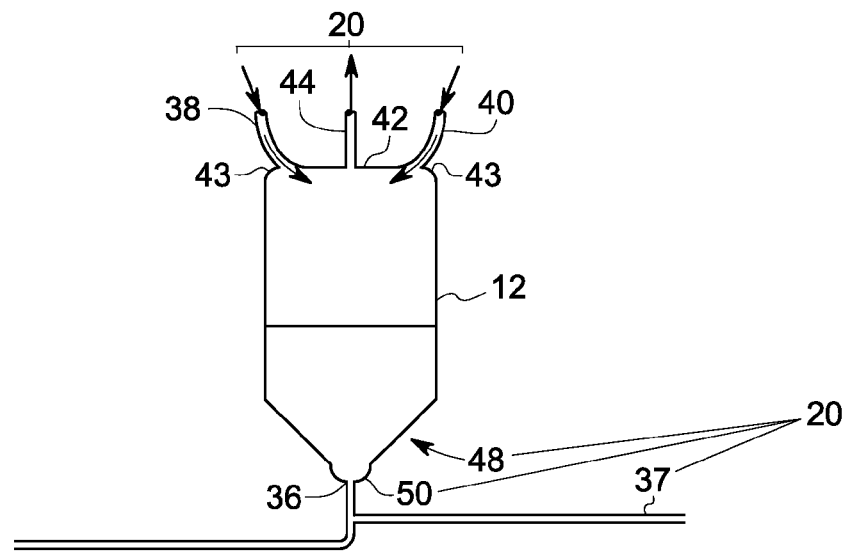
FIG. 5 is a diagrammatical view of a macro-chamber having features for controlling flow of a dry gas, and surface area of a liquid content in accordance with an exemplary embodiment of the present invention.

Referring to FIG. 5, the macro-chamber 12 in accordance with one embodiment of the present invention is disclosed. In the illustrated embodiment, the system 20 includes a tapered section 48 and a section 50 having a predefined edge profile at the first end 36 of the macro-chamber 12.

Figure 6:
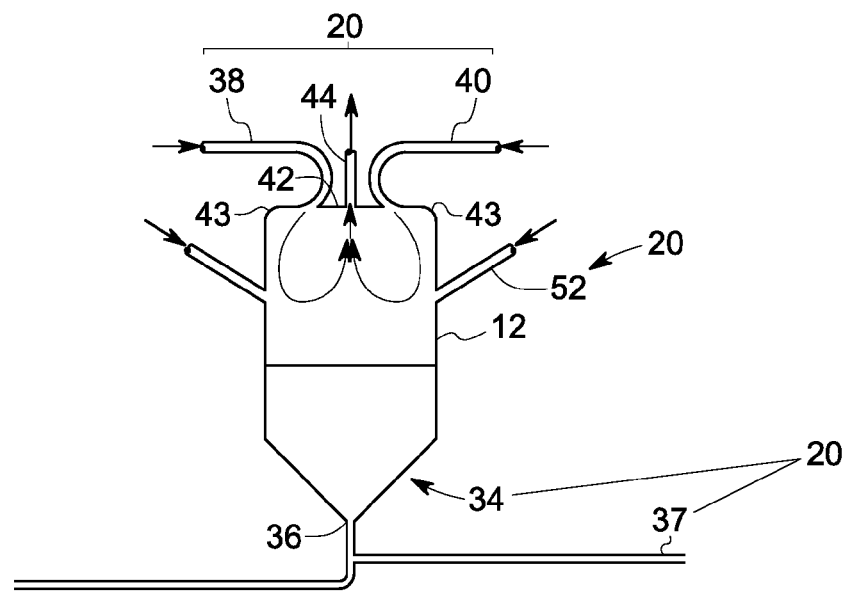
FIG. 6 is a diagrammatical view of a macro-chamber having features for controlling flow of a dry gas, and surface area of a liquid content in accordance with an exemplary embodiment of the present invention.

Referring to FIG. 6, the macro-chamber 12 in accordance with one embodiment of the present invention is disclosed. In the illustrated embodiment, the system 20 includes two third inlets 52 disposed between the first end 36 and the second end 42 of the macro-chamber 12. The third inlets 52 controls flow of the dry gas into and out of the macro-chamber 12. The third inlets 52 also control flow of the reagents into the macro-chamber 12.

Figure 7:
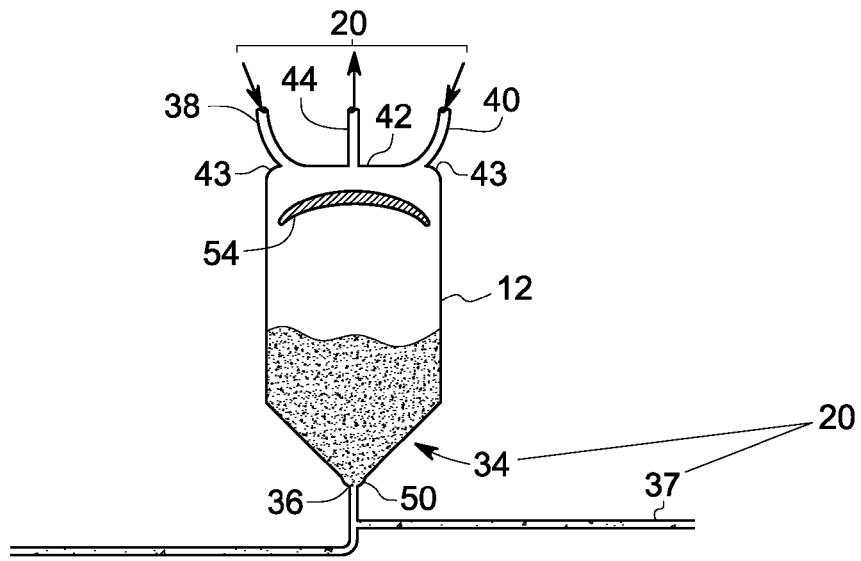
FIG. 7 is a diagrammatical view of a macro-chamber having features for controlling flow of a dry gas, and surface area of a liquid content in accordance with an exemplary embodiment of the present invention.

Referring to FIG. 7, the macro-chamber 12 in accordance with one embodiment of the present invention is disclosed. In the illustrated embodiment, the system 20 includes a bridge structure 54 disposed in the macro-chamber 12 for controlling direct flow of the dry gas from the macro-chamber via the first outlet 44. The bridge structure 54 prevents liquid content such as droplets, aerosolized liquid, or the like in the macro-chamber 12 from directly flowing out via the first outlet 44.

In the embodiments discussed herein, the number and position of the inlets and outlets, and shape of the macro-chamber 12 are designed to rapidly transport liquid vapors from the liquid content in the macro-chamber 12. The design of the macro-chamber 12 allows a sample content to be continuously loaded along with a solvent into the macro-chamber 12, while allowing simultaneous evaporation of the liquid content. High surface to volume ratio is utilized to facilitate rapid evaporation in the macro-chamber 12 without resulting in excessive over-heating. Although, the liquid content surface to volume ratio in the exemplary macro-chamber 12 is smaller compared to some conventional bench top laboratory driers, the smaller size of the surface is compensated by tailoring the gas flow and the enhanced heat transfer. In conventional driers, sample content is first loaded and then the liquid level reduces during the evaporation process, resulting in sticking of compounds to side walls of the drier. In accordance with the embodiments of the present invention, sample content wets only regions in the macro-chamber 12, which corresponds with a target volume in the macro-chamber 12.

Figure 8:
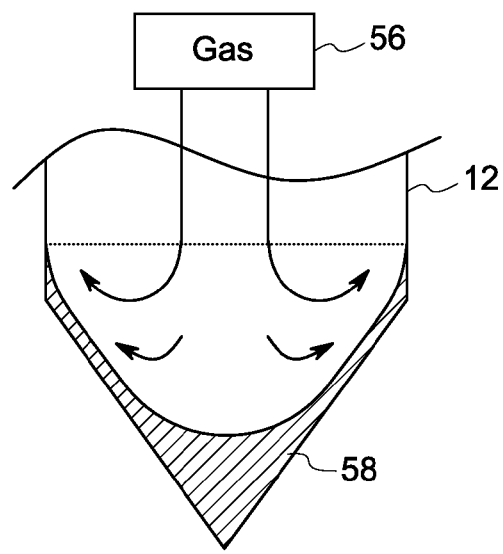
FIG. 8 is a diagrammatical view of a portion of a macro-chamber having a system for controlling the surface area of a content by generating a pressurized gas flow in accordance with an exemplary embodiment of the present invention.

Referring to FIG. 8, a portion of the macro-chamber 12 in accordance with one embodiment of the present invention is disclosed. In the illustrated embodiment, the system 20 includes a gas supply source 56 for supplying a pressurized gas into the macro-chamber 12 for controlling a surface area of a content 58 in the macro-chamber 12. The content may include one or more reagents, reaction content, or combinations thereof. As the gas is fed into the macro-chamber 12, the content 58 moves up along the chamber wall, resulting in an increase in surface area of the content 58, leading to higher surface to volume ratio.

Figure 9:
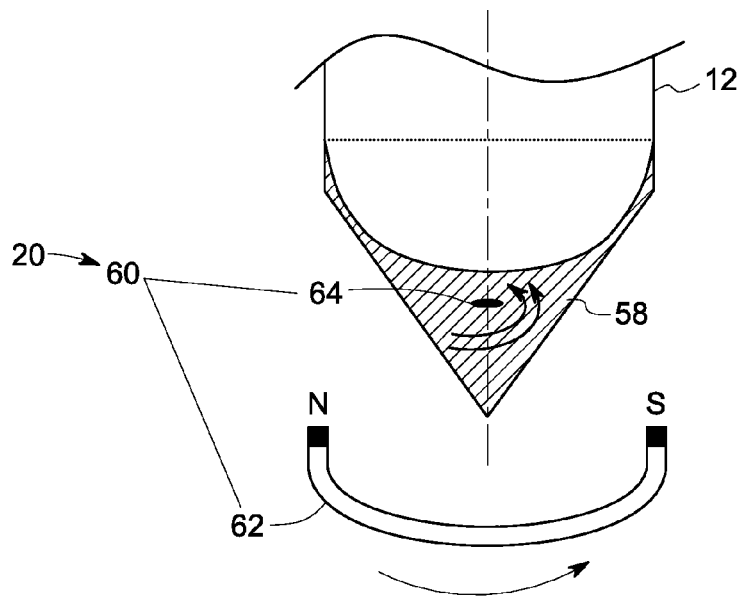
FIG. 9 is a diagrammatical view of a portion of a macro-chamber having a system for controlling the surface area of a content by generating a circulating flow pattern of the content in accordance with an exemplary embodiment of the present invention.

Referring to FIG. 9, a portion of the macro-chamber 12 in accordance with one embodiment of the present invention is disclosed. In the illustrated embodiment, the system 20 includes a magnetic mixer 60 having a rotatable magnet 62 (driver) for rotating a stirrer bar 64 disposed in the content 58 in the macro-chamber 12, for controlling a surface area of a content 58 in the macro-chamber 12. When the stirrer bar 64 is actuated, circulating flow patterns of the content 58 are generated, resulting in an increase of surface area of the content 58 and consequently higher surface to volume ratio.

Figure 10:
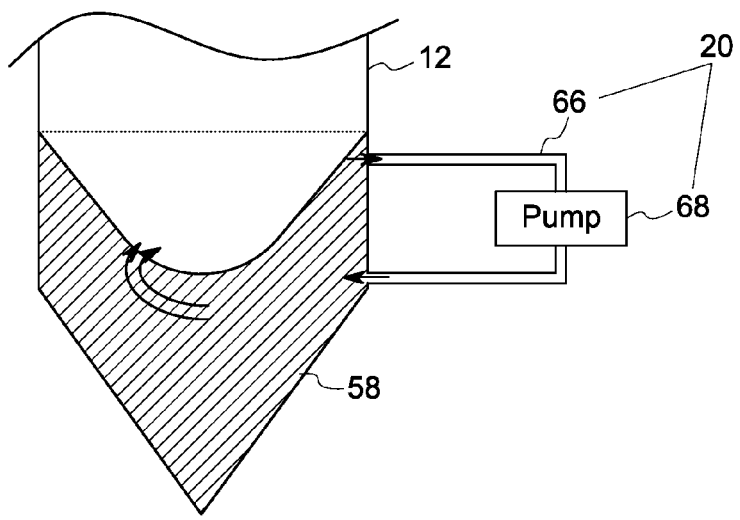
FIG. 10 is a diagrammatical view of a portion of a macro-chamber having a system for controlling the surface area of a content by generating a circulating flow pattern of the content in accordance with an exemplary embodiment of the present invention.

Referring to FIG. 10, a portion of the macro-chamber 12 in accordance with one embodiment of the present invention is disclosed. In the illustrated embodiment, the system 20 includes a circulating channel 66 provided with a pump 68 for circulating flow of the content 58 in the macro-chamber 12 to control surface area of the content 58 in the macro-chamber 12. When the pump 68 is actuated, circulating flow patterns of the content 58 are generated, causing the content 58 to move up along the chamber wall, resulting in an increase in surface area of the content 58, and consequently higher surface to volume ratio.

Figure 11:
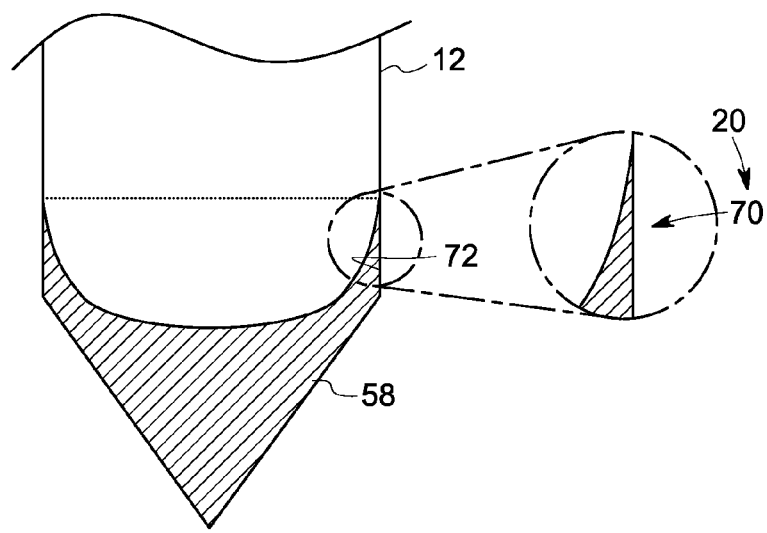
FIG. 11 is a diagrammatical view of a portion of a macro-chamber having a system with a predefined surface topology or a chemical surface modification for controlling the surface area of a content in accordance with an exemplary embodiment of the present invention.

Referring to FIG. 11, a portion of the macro-chamber 12 in accordance with one embodiment of the present invention is disclosed. In the illustrated embodiment, the system 20 includes a predefined surface topology or chemical surface modification 70 integrated to at least a portion of an inner surface 72 of the macro-chamber 12 to control the surface area of the content 58 in the macro-chamber 12. In the illustrated embodiment, the surface modification 70 is a hydrophilic coating. The provision of the surface modification induces wetting of the content 58 on the portion of the inner surface 72 of the macro-chamber 12, causing the content 58 to move up along the chamber wall, resulting in increase of surface area of the content 58, and consequently higher surface to volume ratio.

Figure 12:
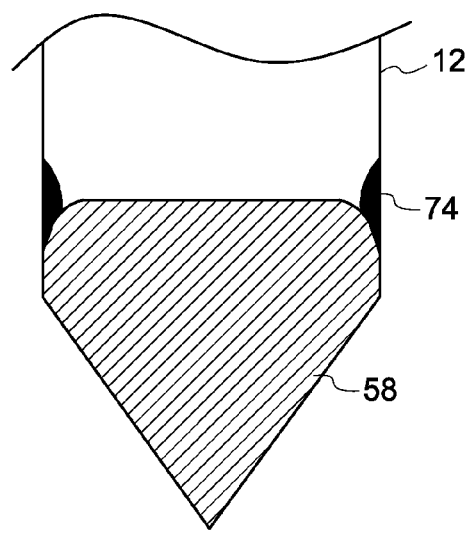
FIG. 12 is a is a diagrammatical view of a portion of a macro-chamber having a system with a predefined surface topology or a chemical surface modification for controlling the surface area of a content in accordance with an exemplary embodiment of the present invention.

Referring to FIG. 12, a portion of the macro-chamber 12 in accordance with one embodiment of the present invention is disclosed. In the illustrated embodiment, the system 20 includes a predefined surface topology or chemical surface modification 74 integrated to at least a portion of an inner surface 72 of the macro-chamber 12 to control the surface area of the content 58 in the macro-chamber 12. In the illustrated embodiment, the surface modification 74 is a hydrophobic coating. The provision of the surface 74 prevents wetting of the content 58 on the portion of the inner surface 72 of the macro-chamber 12, resulting in increase of surface area of the content 58, and consequently higher surface to volume ratio.

Figure 13:
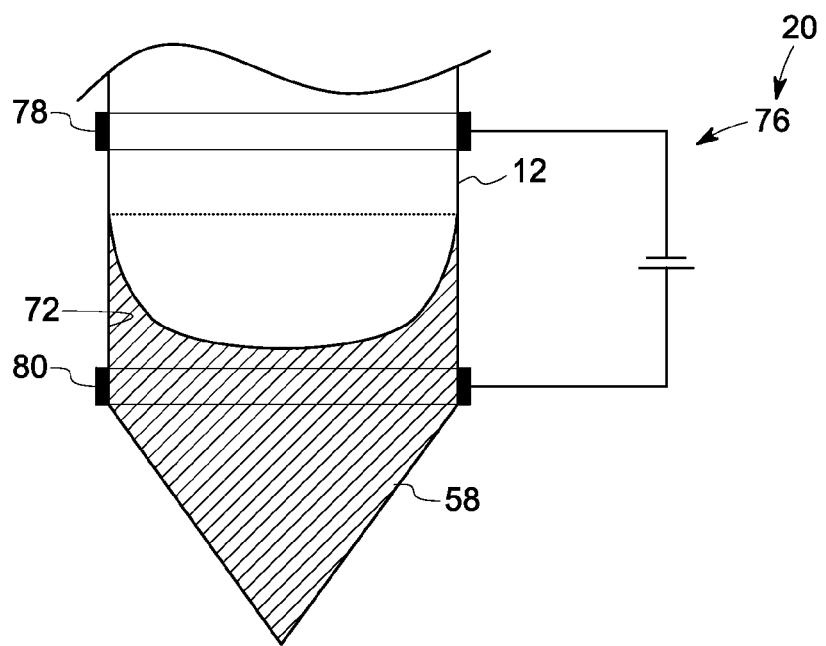
FIG. 13 is a diagrammatical view of a portion of a macro-chamber having a system for controlling the surface area of a content by electro-wetting in accordance with an exemplary embodiment of the present invention.

Referring to FIG. 13, a portion of the macro-chamber 12 in accordance with one embodiment of the present invention is disclosed. In the illustrated embodiment, the system 20 includes an electro-wetting arrangement/element 76 to control the surface area of the content 58 in the macro-chamber 12. When an electric potential is applied between a pair of electrodes 78, 80, the content 58 moves up along the chamber wall, resulting in increase in surface area of the content 58, and consequently higher surface to volume ratio. In an alternate embodiment, electrowetting based on dielectric is also possible, thus avoiding direct electrode contact with the fluid in the macro-chamber 12.

Figure 14:
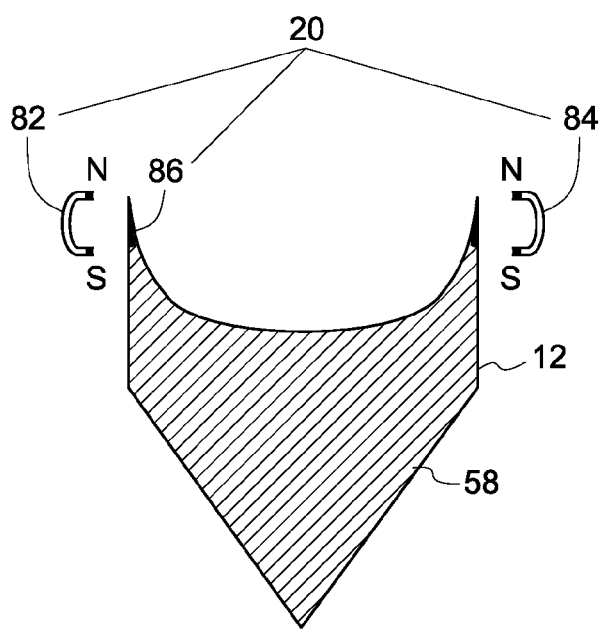
FIG. 14 is a diagrammatical view of a portion of a macro-chamber having a system for controlling the surface area of a content by manipulation of magnetic particles in accordance with an exemplary embodiment of the present invention.

Referring to FIG. 14, a portion of the macro-chamber 12 in accordance with one embodiment of the present invention is disclosed. In the illustrated embodiment, the system 20 includes a plurality of magnetic particles 86 disposed in the macro-chamber 12. When the plurality of magnetic particles 86 are manipulated as illustrated, using a plurality of electromagnets 84, 86, the magnetic particles 86 are moved up along the chamber wall, resulting in capillary effects in the content 58. As a result, the content 58 is moved up towards the particles 86 along chamber wall, resulting in increase in surface area of the content 58, and consequently higher surface to volume ratio.

Referring to FIG. 15, a portion of the macro-chamber 12 in accordance with one embodiment of the present invention is disclosed. In the illustrated embodiment, the system 20 includes a soluble material coating 88 applied on at least a portion of an inner surface 72 of the macro-chamber 12. The coating 88 causes the content 58 to move up along the chamber wall, resulting in increase in surface area of the content 58, and consequently higher surface to volume ratio.

Referring to FIG. 16, a portion of the macro-chamber 12 in accordance with one embodiment of the present invention is disclosed. In the illustrated embodiment, the system 20 includes a thermal zone 90 in the macro-chamber 12. When the thermal zone 90 is switched off, content 58 is moved up along the chamber wall resulting in increase in surface area of the content 58, and consequently higher surface to volume ratio as disclosed in the previous embodiments. When the thermal zone 90 is switched on, content 58 disposed along the chamber wall corresponding to the position of the thermal zone 90, is evaporated, thus limiting the extent of wall wetting.

Many microfluidic devices are planar and incorporation of chamber large enough to exhibit phenomena driven by macroscopically dominant forces such as gravity often entails a reduced surface to volume ratio compared to comparable non-planar arrangements. Since evaporation rates increase with an increase in surface area of the content, a smaller surface area of the content in the macro-chamber is a problem that needs to be overcome if rapid evaporation is important. Moreover, the liquid also transports compounds by surface wetting and a side effect is that such compounds can reach areas of the macro-chamber that was not intended. The compounds may adhere to surfaces in the regions not intended, leading to unwanted adhesion and losses. Releasing the adhered compounds from such regions may be difficult.

Although not shown explicitly in FIGS. 1-16, it should be understood that the temperature of any liquid or gas fed into the system described can be pre-heated, pre-cooled, or maintained at room temperature. Such effects can be used to prevent chemical reactions, to enhance chemical reactions, or to further influence physical processes such as evaporation. The heating and cooling circuits or exchangers can be integrated in the microfluidic device 10, or can be external to the device 10.

The exemplary embodiments discussed above, results in increased surface area and enhanced evaporation rate. Controlling the surface area, and degree to which the content 58 move along the chamber wall facilitates to minimize unwanted wetting of chamber wall.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A microfluidic device, comprising:
   a plurality of reagent sources for a feeding a plurality of reagents, each reagent source feeding a corresponding reagent among the plurality of reagents;
   a macro-chamber for receiving one or more reagents among the plurality of reagents from the plurality of reagent sources and configured to perform operations at a size domain where gravity, mass, and other macro effects dominate over microscale dominating phenomena;
   wherein the macro-chamber comprises a system comprising:
      a first inlet at a first end of the macro-chamber for controlling flow of the one or more reagents among the plurality of reagents into and out of the macro-chamber;
      a second inlet at a second end of the macro-chamber for controlling flow of a dry gas into the macro-chamber;
      a first outlet at the second end of the macro-chamber for controlling flow of the dry gas out from the macro-chamber; and
   a microfluidic reactor coupled to the macro-chamber and the plurality of reagent sources and configured to receive one or more reagents among the plurality of reagents and react the one or more reagents to generate a reaction content; wherein the macro-chamber is further configured to receive the reaction content from the microfluidic reactor.

2. The microfluidic device of claim 1, wherein the system comprises a tapered cross section at the first end of the macro-chamber and a cross section having a continuous edge profile at the second end of the macro-chamber, for controlling flow of at least one of the dry gas, the one or more reagents among the plurality of reagents, into and out of the macro-chamber.

3. The microfluidic device of claim 2, wherein the first inlet further controls flow of the dry gas into the macro-chamber.

4. The microfluidic device of claim 3, wherein the second inlet further controls flow of the one or more reagents among the plurality of reagents into the macro-chamber.

5. The microfluidic device of claim 1, wherein the system comprises a third inlet disposed between the first end and the second end of the macro-chamber for controlling flow of the dry gas into and out of the macro-chamber, wherein the third inlet further controls flow of the one or more reagents among the plurality of reagents into the macro-chamber.

6. The microfluidic device of claim 1, wherein the system comprises a bridge structure disposed in the macro-chamber for controlling direct flow of the dry gas from the macro-chamber via the first outlet.

7. The microfluidic device of claim 1, wherein the first outlet is disposed offset from the continuous edge profile of the macro-chamber for controlling flow of the dry gas from the macro-chamber.

8. The microfluidic device of claim 1, wherein the system comprises a gas supply source for supplying a pressurized gas into the macro-chamber to control a surface area of at least one of the one or more reagents and the reaction content in the macro-chamber.

9. The microfluidic device of claim 1, wherein the system comprises a magnetic stir bar for circulating flow of the one or more reagents in the macro-chamber to control a surface area of at least one of the one or more reagents and the reaction content in the macro-chamber.

10. The microfluidic device of claim 1, wherein the system comprises a circulating channel provided with a pump for circulating flow of the one or more reagents in the macro-chamber to control a surface area of at least one of the one or more reagents and the reaction content in the macro-chamber.

11. The microfluidic device of claim 1, wherein the system comprises an electrowetting element to control a surface area of at least one of the one or more reagents and the reaction content in the macro-chamber.

12. The microfluidic device of claim 1, wherein the system comprises a plurality of magnetic particles disposed in the one or more reagents in the macro-chamber, and a plurality of electromagnets for manipulating the magnetic particles to control a surface area of at least one of the one or more reagents and the reaction content in the macro-chamber.

13. The microfluidic device of claim 1, wherein the system comprises a coating provided to at least a portion of an inner surface of the macro-chamber to control a surface area of at least one of the one or more reagents and the reaction content in the macro-chamber.

14. The microfluidic device of claim 1, wherein the system comprises a soluble material coating applied on at least a portion of an inner surface of the macro-chamber to control a surface area of at least one of the one or more reagents and the reaction content in the macro-chamber.

15. The microfluidic device of claim 1, wherein the system comprises a thermal zone in the macro-chamber to control a surface area of the at least one of the one or more reagents and the reaction content in the macro-chamber.

16. A method, comprising:
   controlling flow of one or more reagents from one or more reagent sources via a first inlet at a first end of a macro-chamber in a microfluidic device, for performing operations at a size domain where gravity, mass, and other macro effects dominate over microscale dominating phenomena;
   controlling flow of a dry gas into and out of the macro-chamber via a second inlet at a second end of the macro-chamber; and
   controlling flow of the dry gas out from the macro-chamber via a first outlet at the second end of the macro-chamber.

17. The method of claim 16, further comprising controlling flow of at least one of the dry gas and the one or more reagents via the first inlet and the second inlet into and out of the macro-chamber; wherein the macro-chamber comprises a tapered cross section at the first end of the macro-chamber and a cross section with a continuous edge profile at the second end of the macro-chamber.

18. The method of claim 17, further comprising controlling exit of the dry gas from the macro-chamber via the first outlet disposed away from the continuous edge profile of the macro-chamber.

19. The method of claim 18, further comprising controlling direct exit of the dry gas from the macro-chamber via the first outlet, using a bridge structure disposed in the macro-chamber.

20. The method of claim 16, further comprising feeding one or more reagents to a microfluidic reactor in the microfluidic device and reacting the one or more reagents to generate a reaction content.

21. The method of claim 20, further comprising feeding a pressurized gas to the macro-chamber to control a surface area of the one or more reagents or the reaction content in the macro-chamber.

22. The method of claim 20, further comprising circulating a flow of the at least one of the one or more reagents and the reaction content in the macro-chamber via a circulating channel provided with a pump, to control a surface area of at least one of the one or more reagents and the reaction content in the macro-chamber.

23. The method of claim 20, further comprising controlling a surface area of at least one of the one or more reagents and the reaction content in the macro-chamber via a coating provided on at least a portion of an inner surface of the macro-chamber.

24. The method of claim 20, further comprising controlling a surface area of at least one of the one or more reagents and the reaction content in the macro-chamber by electrowetting.

25. The method of claim 20, further comprising manipulation of a plurality of magnetic particles disposed in the macro-chamber for controlling a surface area of at least one of the one or more reagents and the reaction content in the macro-chamber.

26. The method of claim 20, further comprising controlling a surface area of at least one of the one or more reagents and the reaction content in the macro-chamber via a soluble material coating provided on a predefined region of an inner surface of the macro-chamber.

27. The method of claim 20, further comprising activating a thermal zone in the macro-chamber for controlling a surface area of at least one of the one or more reagents and the reaction content in the macro-chamber.

* * * * *